Nov. 23, 1943.                E. L. RIETZ                2,334,957
                              DRAFT DEVICE
                           Filed May 18, 1942
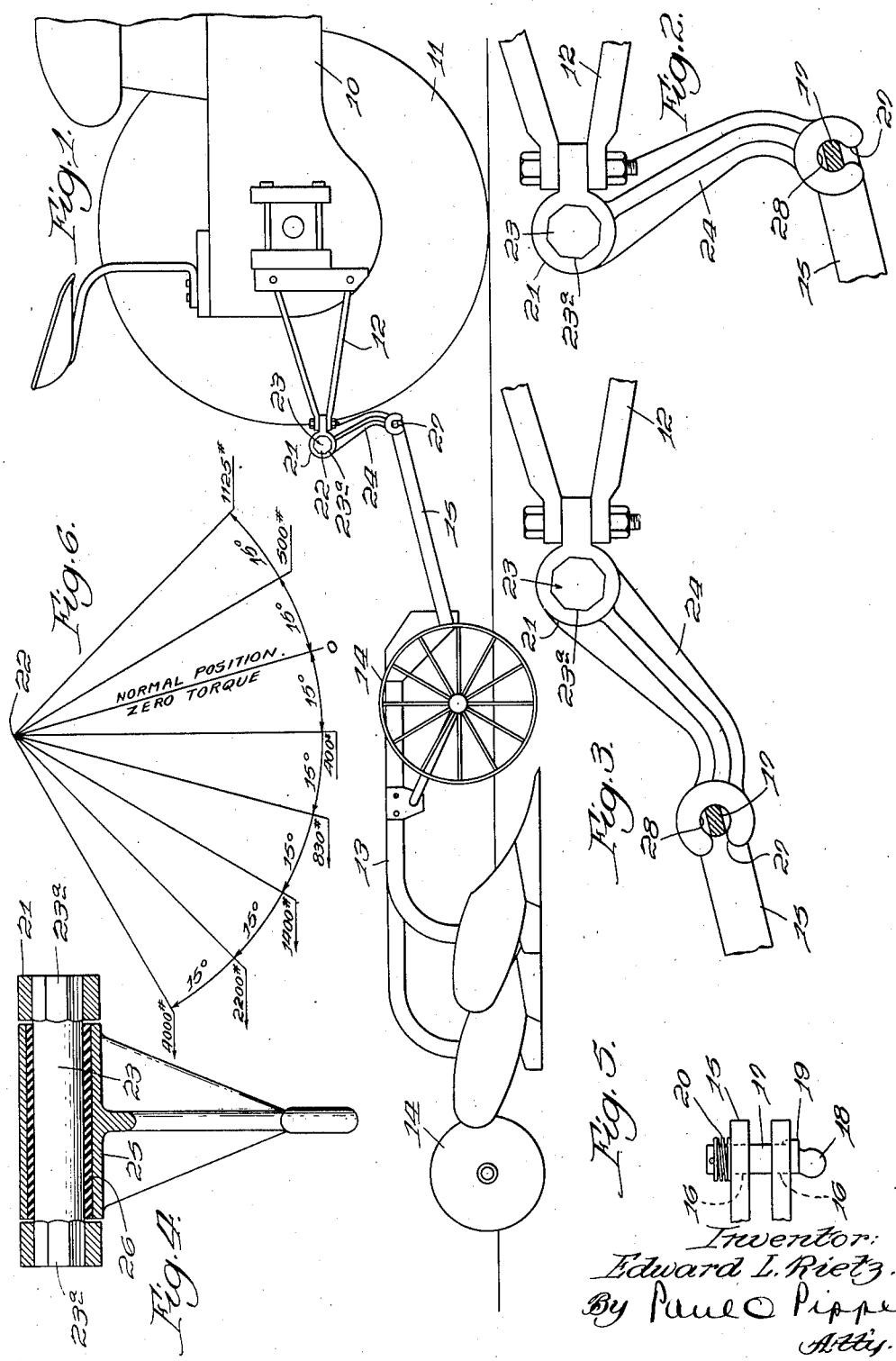
Inventor:
Edward L. Rietz.
By Paul O. Pippel
           Atty.

Patented Nov. 23, 1943

2,334,957

UNITED STATES PATENT OFFICE 2,334,957

DRAFT DEVICE

Edward L. Rietz, Riverside, Ill., assignor to International Harvester Company, a corporation of New Jersey Application May 18, 1942, Serial No. 443,349

3 Claims. (Cl. 280—33.16)

This invention relates to a draft device and particularly to a draft device of the type that is yieldable or releasable upon the application of excess forces tending to separate the elements connected by the draft means.

The invention is particularly useful in the agricultural field as a draft coupling between a tractor and an implement attachment therefor; although, it will be apparent that the device provided according to the invention is similarly applicable as a coupling between vehicles of other types.

Although devices have heretofore been used for the purpose of permitting yieldability or release between a tractor and an attachment therefor and other vehicles, these devices have been usually characterized by complicated and expensive mechanisms involving the use of various linkages and spring members. According to the present invention the hitch device provided is greatly simplified and eliminates many of the complications inherent in earlier structures.

The invention contemplates and has for its principal object provision of an improved and simplified draft device.

An important object of the invention is the provision of hitch means incorporating the use of yieldable or resilient material for providing a shock-absorbing connection or coupling between a pair of vehicles or a vehicle and attachment therefor.

Another important object is the provision of such means that will not only provide a yielding connection but, in addition, will provide a release so that in cases of extreme application of forces tending to separate the vehicle and its connected attachment, the connection will permit the release of the coupling, thus preventing damage to any part of the unit or the coupling.

Another object is to provide a coupling or hitch device having a pair of members pivoted together for relative angular movement, the pivot means consisting of yieldable material distortable or twistable about the pivot axis as forces are applied between the vehicles or the vehicle and an attachment connected thereto.

Still another object is the provision of a coupling of the type just mentioned, in which the resilient material and the lever arm, provided by one of the movable members, cooperate so that continued movement of the members relatively is met by continued resistance of the resilient material; that is to say, initial yielding of the resilient material can be effected by relatively small forces, thus providing a shock-absorbing connection, while subsequent yielding of the material requires the application of comparatively greater forces.

And still another object is to provide a connection which is yieldable in both directions, that is, whether the vehicles be operated forwardly or rearwardly.

A further understanding of the objects and desirable features of the invention may be had from the following detailed description taken in conjunction with the accompanying sheet of drawing, in which:

Figure 1 is a side elevational view of an agricultural implement unit embodying a preferred form of the invention;

Figure 2 is an enlarged elevational view of the component parts of the hitch device;

Figure 3 is a view similar to Figure 2 in which the parts are disposed in positions preparatory to release of the implement from the vehicle;

Figure 4 is a transverse sectional view through the hitch connection, showing the relationship between the parts thereof and the resilient material providing a yieldable connection;

Figure 5 is a fragmentary view showing a detail of the connecting pin which forms a connection with a part of the hitch means; and Figure 6 is a schematic view of the various ranges of movement of the swingable hitch part and the forces required to be applied thereto for moving the hitch part through various degrees of its arc of movement.

Although the drawing and description pertain to a hitch device as applied to an agricultural tractor and attached implement, it will be understood that a similar device within the spirit of the invention may be likewise utilized as a coupling means between interconnected vehicles or as a connecting means for the connecting of an attachment to a vehicle, reference in the latter case being had particularly to that type of agricultural tractor-implement unit represented, for example, by a tractor having cultivator or similar units directly mounted thereon. Other adaptations of the invention will become apparent as the description of the invention progresses.

The drawing in Figure 1 illustrates an agricultural tractor of conventional construction having a main body 10 carried on rear traction wheels 11 (only one of which is shown) and provided with rear draft structure 12. The particular type of draft structure illustrated may be appropriately replaced with any conventional form of draw-bar. The implement represented is a plow generally consisting of a main frame 13 carried on wheels 14 and having a forwardly extending draft tongue 15. The forward end of the tongue 15 is bifurcated or formed of a pair of members spaced transversely apart and having alined openings 16 therein. These openings carry a transverse connecting pin 17 having an intermediate portion formed of elongated cross-section for the purposes that will presently appear. The pin is headed as at 18 and is arranged in the openings 16 for rotation. The head 18 carries a lug portion 19 engageable with one of the members of the tongue 15 for the prevention of rotation of the pin. A coil spring 20 at the side of the pin opposite the head serves to retain the pin in a selected position.

The rear end portion of the draft structure 12 carries a pivot or bearing member 21 providing a pivot on a transverse axis as generally indicated at 22. A transverse shaft 23 is rigidly held against rotation at opposite ends in transversely spaced apart portions of the bearing 21. A depending arm 24 has a sleeve portion 25 loosely encircling the shaft or pin 23 so that an annular space is provided between the outer surface of the shaft and the inner peripheral surface of the sleeve. The shaft 23 is preferably cylindrical at its intermediate portion, although it is quite obvious that any suitable cross-sectional area may be adopted. The arm 24 is mounted on the shaft 23 by means of a sleeve or bushing 26 of resilient distortable material, preferably rubber. In the present instance, the rubber bushing before installation, as best shown in Figure 4, is of quite expanded size, being compressed or reduced to insure a tight fit between the outer and inner surfaces of the shaft 23 and sleeve 25, respectively. It is obvious, of course, that any form of bushing of resilient material may be utilized, and that the engagement between this bushing and the shaft and sleeve may be effected by bonding the material to the proximate surfaces. In an arrangement constructed as just described, the arm 24 is mounted on the bearing member 21 for utilizing swinging movement about the pivot axis 22. The resilient bushing 26 is of such structure as normally to oppose relative movement between the parts, the material being yieldably free to permit desired relative movement.

As previously stated, the arm 24 depends from the shaft 23. The lower end of the arm is notched or slotted as at 27, and the notch opens to an enlarged opening 28, the notch and opening forming generally what is commonly referred to as a keyhole slot. Figure 2 illustrates the position of the arm 24 while no forces are applied to the arm. In other words, the position of the arm 24 in Figure 2 corresponds to the "zero torque" position illustrated in Figure 6. As best shown in Figure 2, the pin 17 on the forward end of the draft tongue 15 of the implement is carried in the opening 28 of the arm. The pin is so disposed that its elongated cross-sectional portion is arranged in locking relation to the slot 27. In this position of the parts, the tongue 15 remains connected to the arm 24. The pin 17, as previously stated, may be rotated in the openings 16 in the tongue so that the elongated cross-sectional portion of the pin 17 may be disposed vertically with respect to the slot 27 so that the tongue may be disconnected from the arm. This procedure also facilitates connection of the tractor to the implement. The ends of the shaft 23 are formed octagonal in cross-section, as at 23a, and the end portions of the bearing or bracket 21 are shaped to fit the shaft ends. It will be obvious, of course, that the shaft ends and bracket portions may be serrated or otherwise formed to obtain the function to be described. In this manner there is provided adjustment means for permitting adjustability between the hitch parts 21 and 24, whereby the arm or part 24 may be positioned selectively with respect to the draft structure 12 and tongue 15 of the implement to vary the required forces necessary to effect different degrees of yielding of the bushing 26 or different periods at which the tongue 15 will release from the arm 24.

In the operation of the particular unit illustrated, the parts appear as shown in Figure 1. When the tractor moves forwardly, draft forces are, of course, applied to the implement through the tongue 15. Depending upon the resistance set up by the implement, the arm 24 swings rearwardly about the yieldable pivotal connection provided by the bushing 26. The various degrees of swinging movement of the arm and the forces, in pounds, for effecting this movement are illustrated in Figure 6. Assuming that the implement has engaged some obstacle preventing continued forward movement thereof, the arm 24 will swing yieldably rearwardly upon continued forward movement of the tractor until the arm reaches the position shown in Figure 3. In this position, maximum torque has been applied to the arm, and the relation between the arm and the tongue 15 is such that the narrow dimension of the intermediate portion of the pin 17 becomes alined with the slot 27 in the arm. Continued forward movement of the tractor then results in a disconnection between the tractor and implement; specifically, the tongue 15 pulls out of or escapes the opening 28 in the arm. Because of the resiliency of the bushing 26, the arm 24 returns to normal position. It is then necessary to reconnect the tractor and implement.

Whatever disadvantages caused by necessity of reconnecting the tractor and implement are clearly offset by advantages resulting from the elimination of probable damage to the tractor, implement, or the parts making up the hitch connection. In the event that it becomes necessary to back the vehicle and implement, the bushing 26 provides a shock-absorbing means very similar to that resulting from the forward operation of the unit as just described. This result is diagrammatically illustrated in the right-hand portion of Figure 6.

It is to be understood that the hitch device described may function without the releasability feature consisting of the notched end of the arm 24 and the connecting pin 17 of the tongue 15. For example, it may be desirable to utilize the hitch merely as a shock-absorbing means between the implement and tractor, in which case a positive connection may be provided between the arm 24 and the tongue 15. The ability of the bushing to yield torsionally upon application of forces to the arm 24 provides a desirable and effective yielding hitch. The arrangement of the arm 24 with respect to the line of draft between the tractor and implement is such as to provide a lever arm initially effective for yielding in respect to relatively small forces, as particularly illustrated by the first phases of rearward swinging of the arm as shown in Figure 6. As the arm 24 swings rearwardly, it more nearly parallels the theoretical line of draft, and its effectiveness as a lever arm is lessened as far as concerns its effect upon the yieldability of the resilient bushing 26. Accordingly, during the first phases of limited relative movement between the vehicle and implement, the hitch or coupling provides a very effective cushion for initial shocks and strains. This result obtains during forward or rearward movement of the vehicle and implement.

The foregoing description should suffice to illustrate the many practicable advantages of the hitch provided according to the present invention. It will be understood, of course, that these advantages are obtainable in the application of the principles of the invention to the connection of other forms and types of vehicle or vehicles and connectable attachments therefor. In this class may be illustrated such units as draft vehicles and trailers, tractors and attached cultivators and mowers and the like, and other similar vehicular units of which the foregoing are representative. It will be also appreciated that numerous alterations and modifications may be made in the preferred form of the invention described without departing from the spirit and scope of the invention as defined in the appended claims.

What is claimed is:

1. Releasable hitch means for connecting a trailing vehicle to a draft vehicle, comprising a hitch part adapted to be connected to one vehicle, a release member, means mounting the member on the first hitch part for angular movement with respect to said part in a direction opposite to the direction of travel of the vehicles, means comprising yieldable material arranged between said member and hitch part to resist said movement, said member having a notch therein extending generally at an angle to the line of draft, and means adapted to connect the other vehicle and the release member including a hitch part engaging the notch in the release member, said release member being yieldably movable angularly upon an excess of draft force between the vehicles to dispose the notch in said member generally coincident with the line of draft for disengagement of the last named hitch part therefrom.

2. Releasable hitch means for connecting a trailing vehicle to a draft vehicle comprising a member yieldably swingable on said draft vehicle and having a notch therein normally extending at an angle to the line of draft, means adapted to connect the trailing vehicle and the said member including a hitch part engaging the notch in said member, whereby upon an excess of draft force between the vehicles said member swings to dispose the notch in said member substantially in alinement with the line of draft for automatic disengagement of the hitch part.

3. Releasable hitch means for connecting vehicles comprising a pivot shaft on one of said vehicles, an arm having a transverse sleeve at one end thereof superposing said pivot shaft and annularly spaced therefrom, a bushing of resilient material interposed between said shaft and sleeve, said arm having a notch in its other end normally extending at an angle to the line of draft, a hitch member adapted to adjoin the other vehicle and engage said notch, whereby upon an excess of draft force between the vehicles said arm swings angularly about the pivot shaft thereby torsionally compressing the resilient bushing to a position where the notch in said arm is in substantial alinement with the line of draft for disengagement of the hitch member.

EDWARD L. RIETZ.